United States Patent
Ito

(10) Patent No.: US 9,825,848 B2
(45) Date of Patent: Nov. 21, 2017

(54) COMMUNICATION NETWORK AND DATA TRANSMISSION AND RECEPTION METHOD THEREOF

(71) Applicant: NEC Corporation, Tokyo (JP)

(72) Inventor: Eri Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 126 days.

(21) Appl. No.: 14/776,119

(22) PCT Filed: Sep. 27, 2013

(86) PCT No.: PCT/JP2013/005780
§ 371 (c)(1),
(2) Date: Sep. 14, 2015

(87) PCT Pub. No.: WO2014/141332
PCT Pub. Date: Sep. 18, 2014

(65) Prior Publication Data
US 2016/0021598 A1    Jan. 21, 2016

(30) Foreign Application Priority Data
Mar. 14, 2013  (JP) ................. 2013-051264

(51) Int. Cl.
*H04L 12/721*  (2013.01)
*H04W 40/06*  (2009.01)
(Continued)

(52) U.S. Cl.
CPC .............. *H04L 45/44* (2013.01); *H04L 45/72* (2013.01); *H04W 40/06* (2013.01); *H04W 88/08* (2013.01); *H04W 92/20* (2013.01)

(58) Field of Classification Search
CPC ...... H04L 12/4633; H04L 45/00; H04L 45/44
See application file for complete search history.

(56) References Cited

U.S. PATENT DOCUMENTS 7,835,698 B2 * 11/2010 Eyuboglu ............. H04W 36/06
370/329
8,762,501 B2    6/2014 Kempf et al.
(Continued)

FOREIGN PATENT DOCUMENTS

JP    2011-030077    2/2011
JP    2011-512763    4/2011
(Continued)

OTHER PUBLICATIONS

Rob Sherwood, Glen Gibby, Kok-Kiong Yapy, Guido Appenzellery, Martin Casado, Nick McKeowny, Guru Parulkar, "FlowVisor: A Network Virtualization Layer", 2009, Deutsche Telekom Inc. R&D Lab, Stanford University, Nicira Networks.*
(Continued)

*Primary Examiner* — Omer S Mian
(74) *Attorney, Agent, or Firm* — Young & Thompson

(57) ABSTRACT

A communication network includes base stations. Each base station includes a BS function unit, a terminal function unit, a transfer unit, and an antenna. The antenna receives first uplink data from a subscriber terminal and downlink data transmitted from another base station and transmits downlink data to another base station or a subscriber terminal. The terminal function unit converts the downlink data received by the antenna to second uplink data. The BS function unit demodulates and outputs the first uplink data or the second uplink data as first data, and modulates input second data into downlink data and transmits the downlink data from the antenna. The transfer unit recognizes a communication destination of the first data, and, when a transfer of the first data is required, outputs the first data to the BS function unit as second data.

9 Claims, 13 Drawing Sheets

(51) Int. Cl.
*H04W 88/08* (2009.01)
*H04W 92/20* (2009.01)

(56) References Cited

U.S. PATENT DOCUMENTS

| | | | |
|---|---|---|---|
| 9,525,613 B2 | 12/2016 | Akiyoshi | |
| 2009/0207761 A1 | 8/2009 | Tangemann et al. | |
| 2012/0252458 A1* | 10/2012 | Ohnishi | H04L 43/062 455/436 |
| 2013/0028073 A1* | 1/2013 | Tatipamula | H04L 41/12 370/218 |
| 2013/0046882 A1* | 2/2013 | Takashima | H04L 45/38 709/224 |
| 2013/0148667 A1 | 6/2013 | Hama et al. | |
| 2013/0207841 A1* | 8/2013 | Negus | H04W 4/00 342/359 |
| 2013/0343229 A1* | 12/2013 | Gasparakis | H04L 45/66 370/256 |

FOREIGN PATENT DOCUMENTS

| | | | |
|---|---|---|---|
| JP | 2012-238996 | 12/2012 | |
| WO | WO 2011083786 A1 * | 7/2011 | ............ H04L 45/38 |
| WO | WO 2011/155484 | 12/2011 | |
| WO | WO 2012/023604 | 2/2012 | |
| WO | WO 2013/030693 | 3/2013 | |

OTHER PUBLICATIONS

Japanese Office Action dated Nov. 29, 2016 in corresponding Japanese Patent Application No. 2015-505080 with English translation of enclosed wavy lined portion of Japanese Office Action.
International Search Report, PCT/JP2013/005780, dated Nov. 26, 2013.

* cited by examiner

COMMUNICATION NETWORK AND DATA TRANSMISSION AND RECEPTION METHOD THEREOF

TECHNICAL FIELD

The present invention relates to a communication network and data transmission and reception method of the communication network.

BACKGROUND ART

Mobile network systems using subscriber terminals, such as mobile phones, have already become widespread. In a mobile network, which intermediates mobile phone calls and data transmission and reception, a lot of base stations, which carry out data exchange with mobile phones, are arranged. These base stations have a so-called cellular configuration and form a coverage in which communication with subscriber terminals is provided. Each base station receives transmission data transmitted from subscriber terminals and transmits the received data to a core network via a transmission line. Each base station also transmits data that are received through the core network and the transmission line to subscriber terminals. The core network is connected to external networks, such as the Internet line. As an example, in the LTE (Long Term Evolution), an S1 interface, which links each base station (evolutional Node B (abbreviated as eNB)) with a core system (Evolved Packet Core: EPC), or the like is defined by 3GPP (NPL 1). For a link between the core network and a base station, a long-distance and large-capacity transmission is required. Therefore, a wire communication means, such as optical communication by use of optical fibers, or a high-speed wireless communication means is required to be laid down as a transmission line for the link between the core network and a base station, in general.

Recent years, the OpenFlow technology has been proposed as a network configuration method (NPLs 2 and 3). The OpenFlow technology is a technology that separates a packet transfer function from a routing control function by the opened OpenFlow protocol. An OpenFlow network is configured with an OFS (OpenFlow Switch), which has the packet transfer function, and an OFC (OpenFlow Controller), which has the routing control function. The OFC is capable of centrally controlling a plurality of OFSes.

The OFC registers information on conditions and processing for packet filtering and the like in a flow table of the OFS. The OFS carries out processing, such as data transfer, based on the flow table. A physical port number, transmission source/destination MAC (Media Access Control) addresses, a VLAN (Virtual Local Area Network) ID, transmission source/destination IP (Internet Protocol) addresses, a port number in TCP (Transmission Control Protocol)/UDP (User Datagram Protocol), and the like can be used as conditions in the flow table. Thus, it is possible to carry out control by combining information at Layers 1 to 4.

The OFC is capable of monitoring traffic by acquiring statistical information of the OFS. When the network is disconnected due to a failure of the OFS or the like, the OFC is capable of detecting the disconnection immediately. The OFC is capable of recalculating a path in accordance with detected the disconnection and resetting an alternative path.

CITATION LIST

Non Patent Literature

NPL 1: "3GPP TS 36.300 V9.10.0", [Online], December, 2012, 3GPP Organizational Partners, [retrieved on Mar. 4, 2012], the Internet <URL: http://www.3gpp.org/ftp/Specs/archive/36_series/36.300/36300-9a0.zip>

NPL 2: "OpenFlow Switch Specification Version 1.0.0 (Wire Protocol 0x01)", [Online], Dec. 31, 2009, [retrieved on Mar. 4, 2012], the Internet <URL: http://www.openflow.org/documents/openflow-spec-v1.0.0.pdf>

NPL 3: "OpenFlow Switch Specification Version 1.1.0 Implemented (Wire Protocol 0x02)", [Online], Feb. 28, 2011, [retrieved on Mar. 4, 2012], the Internet <URL: http://www.openflow.org/documents/openflow-spec-v1.1.0.pdf>

SUMMARY OF INVENTION

Technical Problem

However, the applicant has found that there is a problem described below in the above-described mobile network. To build the above-described mobile network, in addition to construction of a coverage connecting subscriber terminals with base stations, transmission lines that connects a core network with respective base stations are required to be constructed. In consequence, designing the mobile network becomes complex, and, accordingly, the cost of appliances composing the transmission lines and constructing work and maintenance work of the transmission lines becomes substantial regardless of distinction between wire and wireless communication. Since a large scale core network which can process data from all base stations is required, the equipment cost for the core network also becomes expensive.

The present invention is invented in consideration of the above-described situation, and an object of the present invention is to provide a communication network that is capable of data transmission and reception between base stations with a simple configuration.

Solution to Problem

A communication network that is an aspect of the present invention includes a plurality of base stations that are capable of data transmission and reception with one another, wherein each of the plurality of base stations includes an antenna that receives first uplink data from a subscriber terminal and downlink data transmitted from another base station and transmits downlink data to another base station or a subscriber terminal, a first data conversion means that converts downlink data received by the antenna to second uplink data, a communication means that demodulates the first uplink data or the second uplink data, outputs the demodulated first uplink data or the demodulated second uplink data as first data, modulates input second data into downlink data, and transmits the downlink data from the antenna, and a transfer means that recognizes a communication destination of the first data and, when a transfer of the first data is required, outputs the first data to the communication means as second data.

A data transmission and reception method of a communication network that is an aspect of the present invention includes the steps of receiving first uplink data from a subscriber terminal and downlink data transmitted from another base station by an antenna of each of a plurality of base stations that are capable of reciprocal data transmission and reception, converting downlink data received by the antenna to second uplink data, demodulating the first uplink data or the second uplink data and outputting the demodulated first uplink data or second uplink data as first data, recognizing a communication destination of the first data, when a transfer of the first data is required, outputting the first data as second data, and modulating the second data into downlink data and transmitting the downlink data.

Advantageous Effects of Invention

The present invention is able to provide a communication network that is capable of data transmission and reception between base stations with a simple configuration.

DESCRIPTION OF EMBODIMENTS

Figure 1:
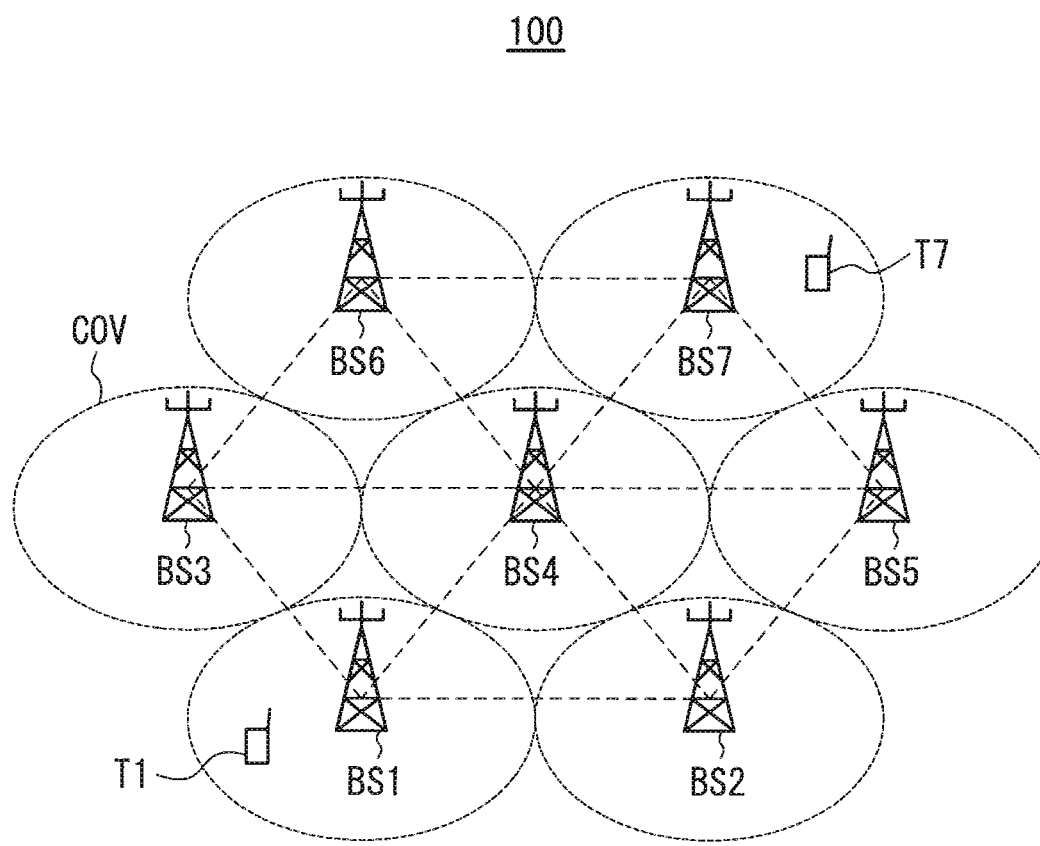
FIG. 1 is a configuration diagram schematically illustrating a configuration of a communication network 100 according to a first exemplary embodiment.

Exemplary embodiments of the present invention will be described below with reference to the accompanying drawings. In the respective drawings, the same components will be denoted by the same reference numerals, and duplicate description thereof will be omitted as appropriate.

First Exemplary Embodiment

First, a communication network 100 according to a first exemplary embodiment will be described. FIG. 1 is a configuration diagram schematically illustrating a configuration of the communication network 100 according to the first exemplary embodiment. The communication network 100 is configured with base stations BS1 to BS7. The communication network 100 is configured as a mobile network that enables communication by subscriber terminals (mobile terminals, such as mobile phones) that are included in the coverage of the communication network. FIG. 1 illustrates wireless communication paths between neighboring base stations by dashed lines.

FIG. 1 illustrates a coverage of each of the base stations BS1 to BS7 by a dotted line COV. Although each coverage is illustrated as an ellipse, this is only an example. In reality, there is a case in which a coverage has an asymmetric shape due to shielding, reflection, or the like of a radio wave by buildings or overlaps neighboring coverages.

FIG. 1 illustrates, as examples of the subscriber terminals, a subscriber terminal T1, which is located within the coverage of the base station BS1, and a subscriber terminal T7, which is located within the coverage of the base station BS7. The numbers of subscriber terminals and base stations are only examples, and an arbitrary number of subscriber terminals and an arbitrary number of base stations may be included.

The base stations BS1 to BS7 have a cellular configuration and thereby form a coverage that provides communication between subscriber terminals. The base stations BS1 to BS7 receive transmission data transmitted from subscriber terminals. Each of the base stations BS1 to BS7 is capable of data transmission and reception with other base stations via a wireless communication means. The base stations BS1 to BS7 also transmit data that are received through one or a plurality of other base stations to subscriber terminals.

Figure 2A:
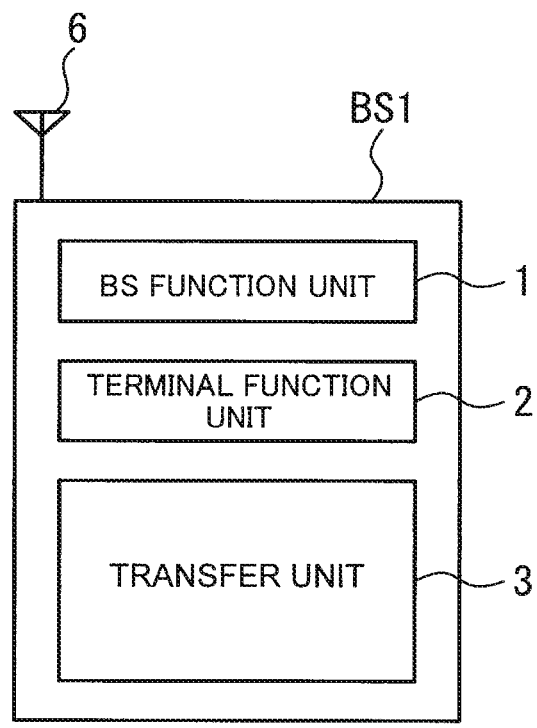
FIG. 2A is a block diagram schematically illustrating a configuration of a base station BS1.
Figure 2B:
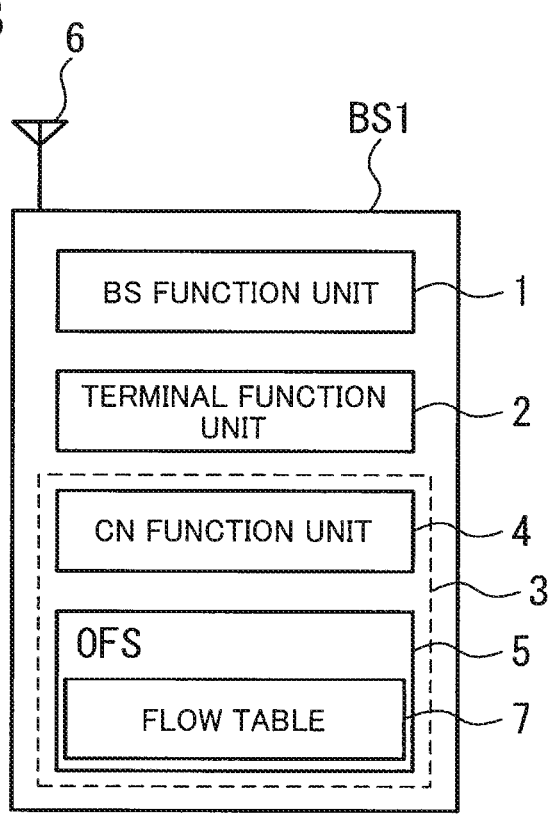
FIG. 2B is a block diagram illustrating the configuration of the base station BS1 in more detail.

Since the respective base stations BS1 to BS7 have the same configuration, the configuration of the base station BS1 will be described below as a representative. FIG. 2A is a block diagram schematically illustrating the configuration of the base station BS1. FIG. 2B is a block diagram illustrating the configuration of the base station BS1 in more detail. The base station BS1 includes a BS (Base Station) function unit 1, a terminal function unit 2, a transfer unit 3, and an antenna 6. The transfer unit 3 includes a CN (Core Network) function unit 4 and an OFS (OpenFlow Switch) 5.

Hereinafter, the BS function unit 1 is also referred to as communication unit or communication means. The terminal function unit 2 is also referred to as first data conversion unit or first data conversion means. The transfer unit 3 is also referred to as transfer means. The CN function unit 4 is also referred to as second data conversion unit or second data conversion means. The OFS 5 is also referred to as decision unit or decision means.

When the BS (Base Station) function unit 1 receives data from the subscriber terminal T1 (uplink communication at a frequency fu), the BS function unit 1 receives the uplink data (also referred to as first uplink data), which are wireless transmission data received from the subscriber terminal T1, by the antenna 6. The BS function unit 1 then demodulates the received uplink data and transmits the demodulated data (also referred to as first data) to the CN (Core Network) function unit 4. When the BS function unit 1 transmits downlink data to the outside (downlink communication at a frequency fd), the BS function unit 1 applies modulation processing to data (also referred to as second data) that is received from the CN function unit 4. The BS function unit 1 then, by radiating a radio wave from the antenna 6, transmits the downlink data to the outside.

In the first exemplary embodiment and subsequent exemplary embodiments, a transmission source that transmits data first is also referred to as communication source. A receiving end that is the final destination of the data is also referred to as communication destination. In the first exemplary embodiment, the subscriber terminal T1 and the subscriber terminal T7 are the communication source and the communication destination thereof, respectively. Further, data that are transmitted between the communication source and the communication destination include information that specifies the communication destination, such as a specific number and an IP address. By referring to the information specifying a communication destination, each base station is able to recognize the transmission destination of data.

The terminal function unit 2 receives downlink data that are transmitted from another base station via the antenna 6. The terminal function unit 2 then converts the received downlink data to uplink data (also referred to as second downlink data). The terminal function unit 2 transmits the converted uplink data to the BS function unit 1.

The CN (Core Network) function unit 3 converts data that are transmitted and received through a specific interface into IP (Internet Protocol) format, which is controllable by the OFS 5.

OFS 5 includes a flow table 7, which has been registered in advance. The flow table 7 includes information that specifies a communication path in carrying out wireless communication between the respective base stations. The OFS 5 decides necessity of data transfer, that is, whether or not the base station in which the OFS 5 itself is incorporated is included in a communication path, in accordance with the flow table 7.

Figure 3:
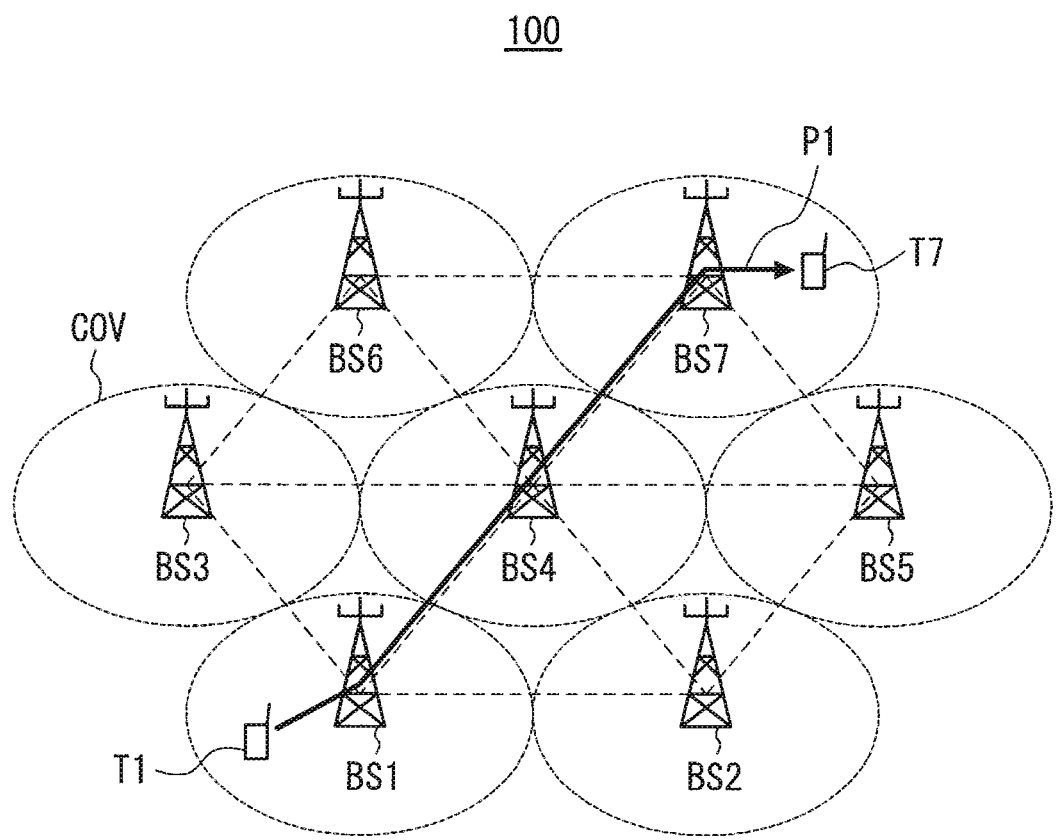
FIG. 3 is a diagram schematically illustrating a flow of data that is transmitted from a subscriber terminal T1, which is located within the coverage of the base station BS1, to a subscriber terminal T7, which is located within the coverage of a base station BS7, in the communication network 100.
Figure 4:
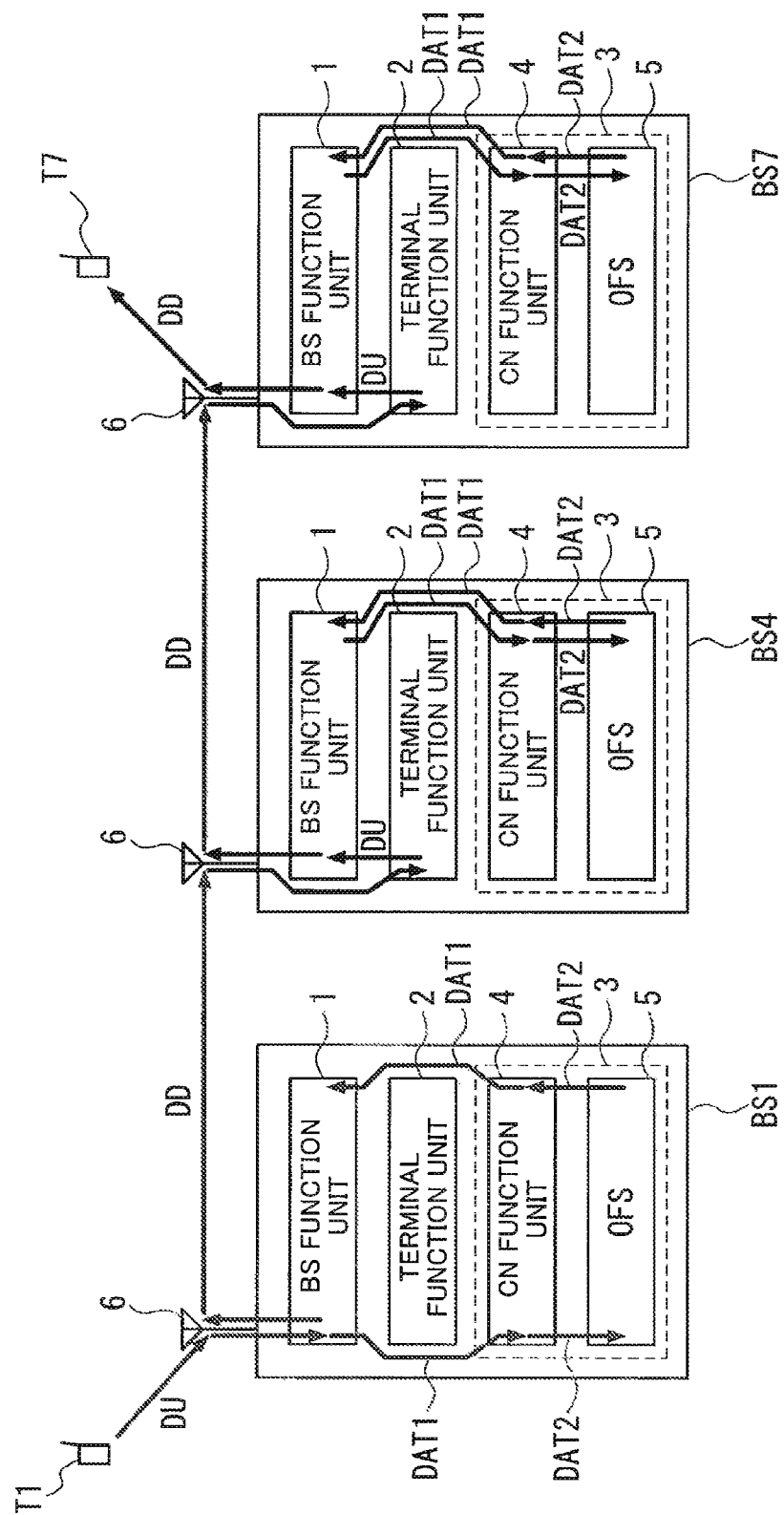
FIG. 4 is a block diagram schematically illustrating a flow of data along a communication path P1 between the subscriber terminal T1 and the subscriber terminal T7 in the communication network 100.

Next, a communication operation in the communication network 100 according to the first exemplary embodiment will be described. In the description, a case in which data are transmitted from the subscriber terminal T1, which is located within the coverage of the base station BS1, to the subscriber terminal T7, which is located within the coverage of the base station BS7, will be described. FIG. 3 is a diagram schematically illustrating a flow of data in a case of transmitting data from the subscriber terminal T1, which is located within the coverage of the base station BS1, to the subscriber terminal T7, which is located within the coverage of the base station BS7, in the communication network 100. FIG. 4 is a block diagram schematically illustrating a flow of data on a communication path P1 between the subscriber terminal T1 and the subscriber terminal T7 in the communication network 100.

First, the subscriber terminal T1 transmits uplink data DU. Since the subscriber terminal T1 is located within the coverage of the base station BS1, the base station BS1 receives the uplink data DU, which is transmitted from the subscriber terminal T1. To transfer the data to the subscriber terminal T7, which is the communication destination, the base station BS1 converts the uplink data DU to downlink data DD and transmits the downlink data DD from the antenna 6. An operation in which a base station, which has received uplink data from a subscriber terminal, transmits downlink data, to which the uplink data are converted, to the outside is referred to as first transfer operation.

Figure 5:
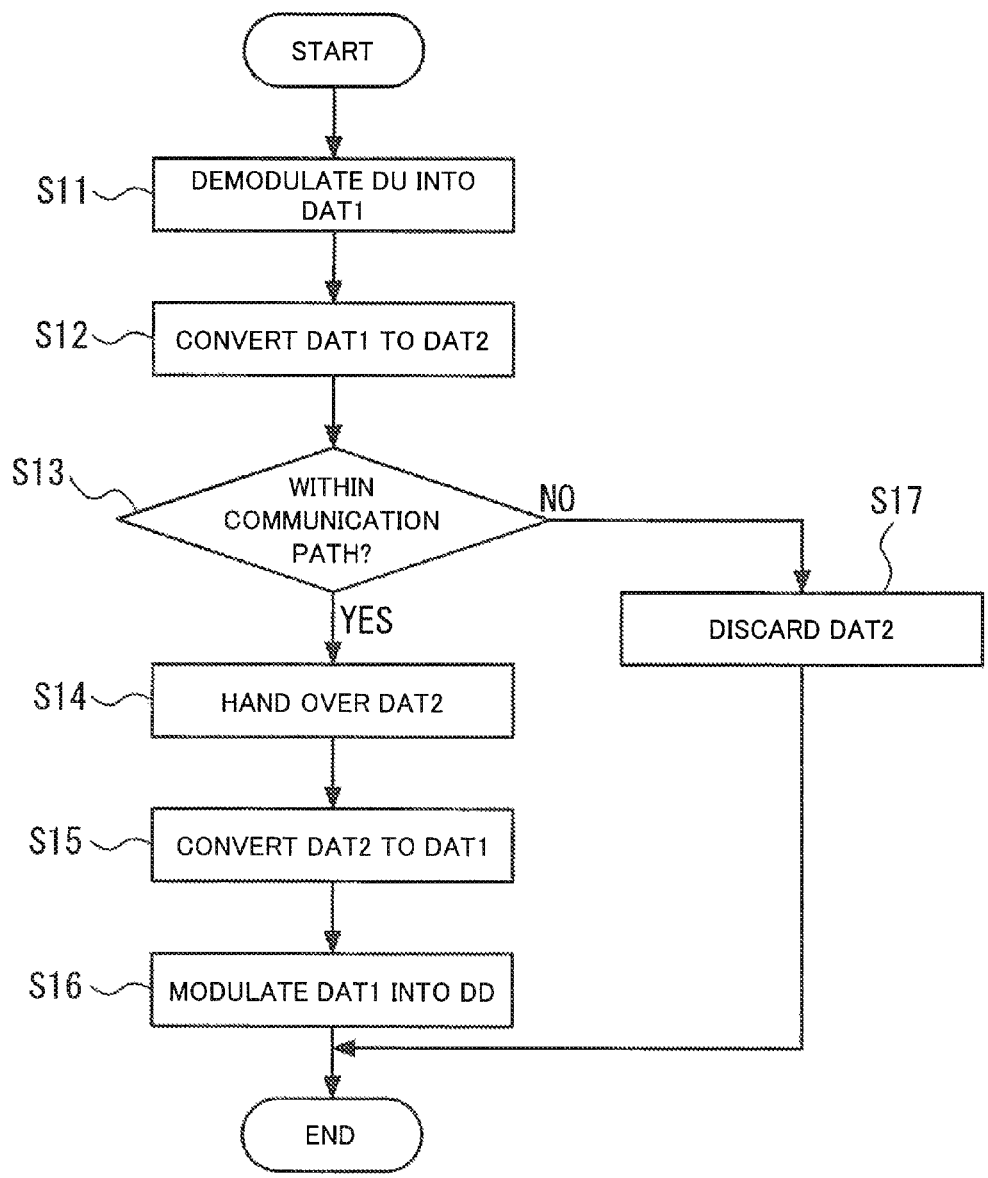
FIG. 5 is a flowchart illustrating a processing procedure of a first transfer operation carried out by a base station that receives uplink data from a subscriber terminal.

The first transfer operation will be described specifically. FIG. 5 is a flowchart illustrating a processing procedure of the first transfer operation carried out by the base station that receives uplink data from the subscriber terminal. The first transfer operation is composed of steps S11 to S17.

Step S11

In the base station BS1, the BS function unit 1 receives the uplink data DU from the subscriber terminal T1 via the antenna 6. The BS function unit 1 demodulates the uplink data DU into data DAT1 and transmits the data DAT1 to the CN function unit 4.

Step S12

The CN function unit 4 converts the data DAT1 to data DAT2 in IP (Internet Protocol) format, which is controllable by the OFS 5. The CN function unit 4 transmits the data DAT2 to the OFS 5.

Step S13

The OFS 5 compares information specifying the receiving end, which is included in the data DAT2, with the flow table 7 and decides whether or not the base station in which the OFS 5 is incorporated is included in a communication path. Since the base station BS1 in this case is a base station that is the starting point of communication between base stations, however, the OFS 5 decides that the base station BS1 is included in the communication path.

Step S14

When the base station in which the OFS 5 is incorporated is included in the communication path, the OFS 5 transmits the data DAT2 to the CN function unit 4.

Step S15

The CN function unit 4 inversely converts the data DAT2 to the data DAT1, which have a format transmittable by the BS function unit 1. The CN function unit 4 transmits the data DAT1 to the BS function unit 1.

Step S16

The BS function unit 1 modulates the data DAT1 into downlink data DD and transmits the downlink data DD to the outside via the antenna 6.

Step S17

On the other hand, when the base station in which the OFS 5 is incorporated is not included in the communication path, the OFS 5 discards the data DAT2 and ends the processing.

Next, the base stations BS2 to BS4, which are neighboring to the base station BS1, receive the downlink data DD from the base station BS1. Only the base station BS4, which is included in the communication path between the subscriber terminal T1 and the subscriber terminal T7, transfers the downlink data DD. An operation in which a base station that receives downlink data from a neighboring base station transfers the downlink data to the outside is referred to as second transfer operation.

Figure 6:
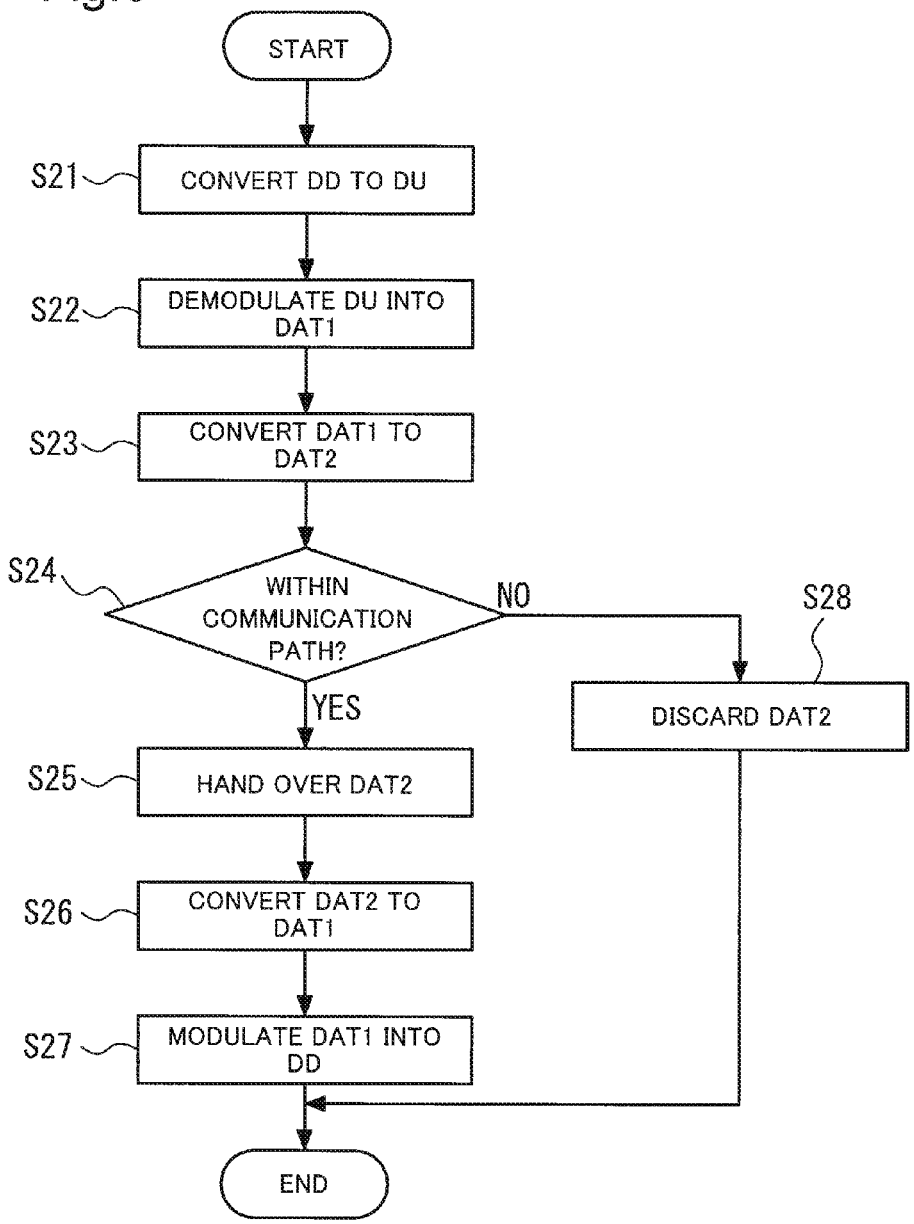
FIG. 6 is a flowchart illustrating a processing procedure of a second transfer operation carried out by a base station that receives downlink data from a neighboring base station.

The second transfer operation will be described specifically. FIG. 6 is a flowchart illustrating a processing procedure of the second transfer operation carried out by a base station that receives downlink data from a neighboring base station. The second transfer operation is composed of steps S21 to S28.

Step S21

In each of the base stations (in this case, the base stations BS2 to BS4) that are neighboring to the base station BS1, the terminal function unit 2 receives the downlink data DD via the antenna 6. The terminal function unit 2 converts the downlink data DD to uplink data DU, which have a format receivable by the BS function unit 1. The terminal function unit 2 transmits the uplink data DU to the BS function unit 1.

Step S22

The BS function unit 1 demodulates the uplink data DU, which is received from the terminal function unit 2, into the data DAT1 and transmits the data DAT1 to the CN function unit 4.

Steps S23 to S28

Since the descriptions of steps S23 to S28 are individually the same as the description of steps S12 to S17 in FIG. 5, the descriptions of steps S23 to S28 will be omitted.

Next, the base stations BS1 to BS3 and BS5 to BS7, which are neighboring to the base station BS4, receives the downlink data DD from the base station BS4. Only the base station BS7, which is included in the communication path between the subscriber terminal T1 and the subscriber terminal T7, transfers the downlink data DD. In other words, the base stations BS1 to BS3 and BS5 to BS7, which are neighboring to the base station BS4, carry out the above-described second transfer operation.

With this processing, the downlink data DD are transmitted from only the base station BS7. Since the subscriber terminal T7 is located within the coverage of the base station BS7, the subscriber terminal T7 is able to receive the downlink data from the base station BS7. As a result, communication between the subscriber terminal T1 and the subscriber terminal T7 becomes possible.

In transmitting data from the subscriber terminal T7 to the subscriber terminal T1, by the base station BS7 carrying out the first transfer operation and a base station neighboring to the base station BS7 and a base station neighboring to the base station BS4 carrying out the second transfer operation, the subscriber terminal T1 is able to communicate with the subscriber terminal T7 in a similar manner.

As described above, in the communication network 100 according to the first exemplary embodiment, a function of the core network that controls a handover of data between base stations (CN function unit 4) and a function that makes it possible to receive downlink data from another base station in a similar manner to receiving downlink data from a subscriber terminal (terminal function unit 2) are incorporated in each base station.

With this configuration, a base station that receives uplink data from a subscriber terminal, which is a transmission source of the data, is able to convert the uplink data to a transmittable downlink data and transmits the downlink data to a succeeding base station on a communication path (the above-described first transfer operation).

A base station on the communication path receives downlink data from another base station by the terminal function unit thereof in a similar manner to receiving downlink data from a subscriber terminal. The base station on the communication path, by converting the downlink data to uplink data and demodulating the uplink data, is subsequently able to carry out an operation similar to an operation carried out by the base station that receives uplink data from a subscriber terminal, which is a transmission source of data (the above-described second transfer operation).

Figure 7:
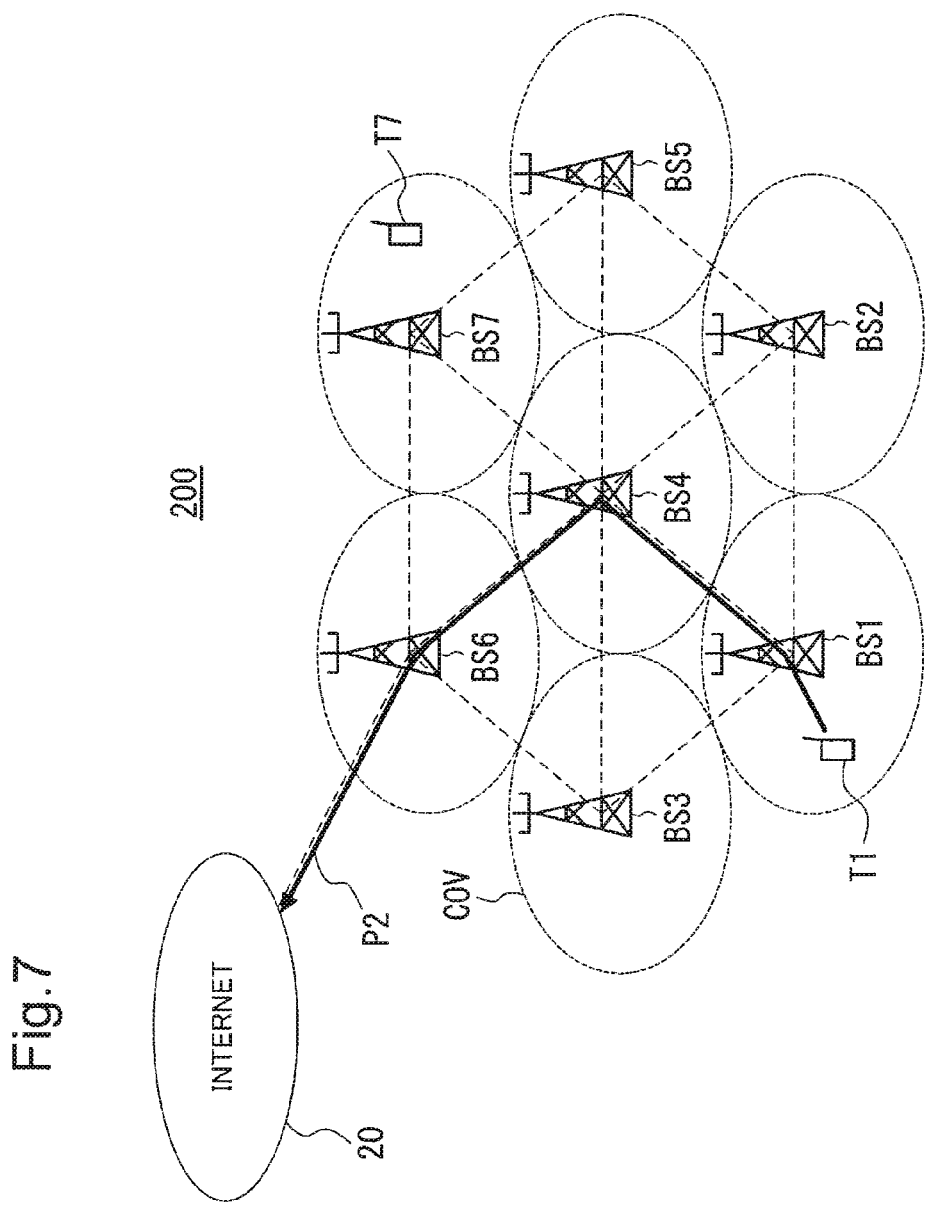
FIG. 7 is a configuration diagram schematically illustrating a configuration of a communication network 200 according to a second exemplary embodiment.

With the configuration according to the first exemplary embodiment, it becomes possible to provide a communication network that uses wireless communication between base stations without laying a core network nor transmission lines. In consequence, it is possible to reduce a cost for laying and maintaining transmission lines. It is also possible to reduce a cost for constructing a core network. Furthermore, a communication path in the communication network is able to be freely set and changed by registering a flow table which specifies communication paths between base stations Second Exemplary Embodiment Next, a communication network 200 according to a second exemplary embodiment will be described. FIG. 7 is a configuration diagram schematically illustrating a configuration of the communication network 200 according to the second exemplary embodiment. The communication network 200 is a variation of the communication network 100 according to the first exemplary embodiment. In the communication network 200, a base station BS6 is connected to the Internet 20. The other portion of the configuration of the communication network 200 is the same as the communication network 100.

In the first exemplary embodiment, communication between the subscriber terminal T1 and the subscriber terminal T7 inside a communication network was described. However, with the configuration according to the second exemplary embodiment, by using a communication path P2, it becomes possible to carry out communication between a subscriber terminal T1 (communication source) that is located inside the communication network and the Internet 20 (communication destination) that is located outside.

Third Exemplary Embodiment

Figure 8:
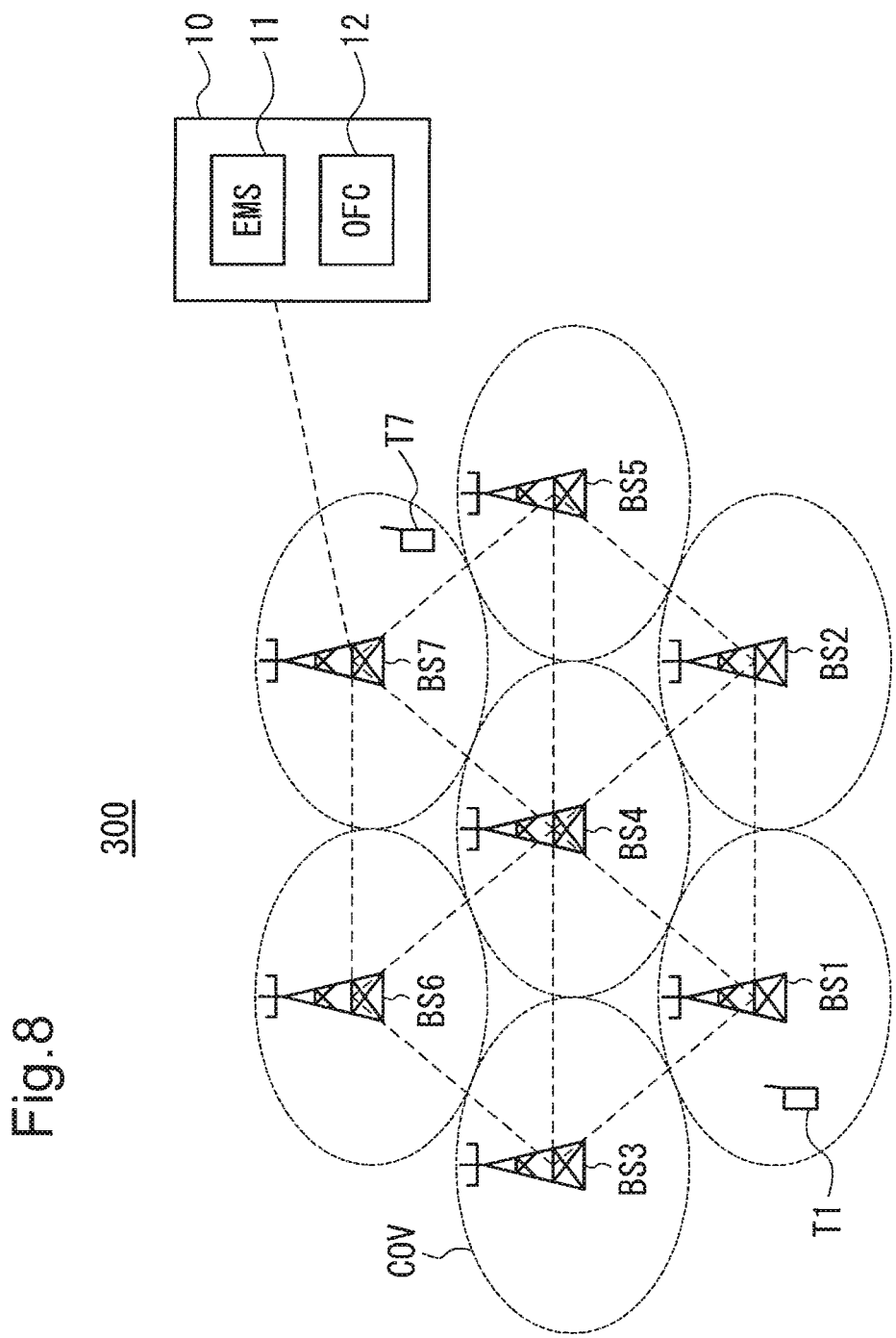
FIG. 8 is a configuration diagram schematically illustrating a configuration of a communication network 300 according to a third exemplary embodiment.

Next, a communication network 300 according to a third exemplary embodiment will be described. FIG. 8 is a configuration diagram schematically illustrating a configuration of the communication network 300 according to the third exemplary embodiment. The communication network 300 is a variation of the communication network 100 according to the first exemplary embodiment. The communication network 300 has a configuration in which a control unit 10 is added to the communication network 100.

At least one control unit 10 is placed in the communication network 300. The control unit 10 includes an EMS (Element Management System) 11 and an OFC (OpenFlow Controller) 12. The EMS 11 has a function to monitor communication between base stations BS1 to BS7 and subscriber terminals and conditions of the base stations BS1 to BS7. The OFC 12 has a function to carry out management and control of an OFS 5 that is incorporated in each of the base stations BS1 to BS7.

Specifically, the OFC 12 has a function to register and update a flow table 7 of the OFS 5 in each base station. The OFC 12 is capable of updating the flow table 7 of the OFS 5 in each base station periodically or aperiodically.

The control unit 10 is, for example, placed so as to be communicable with the base station BS7 through wire communication or wireless communication. Data to update the flow table from the OFC 12 are supplied to the base station BS7 as uplink data or downlink data. The data to update the flow table that the base station BS7 receives are transferred to the respective base stations in the communication network 300 by the respective base stations carrying out a first transfer operation or a second transfer operation. In the operation, for example, the flow table 7 is updated by detecting flag information to update the flow table when the OFS 5 of each base station refers the data to update the flow table (step S13 in FIG. 5 and step S24 in FIG. 5), by including the flag information to update the flow table into the data to update the flow table. In this case, the control unit 10 is a communication source. Each of the base stations BS1 to BS7 is a communication destination.

Figure 9:
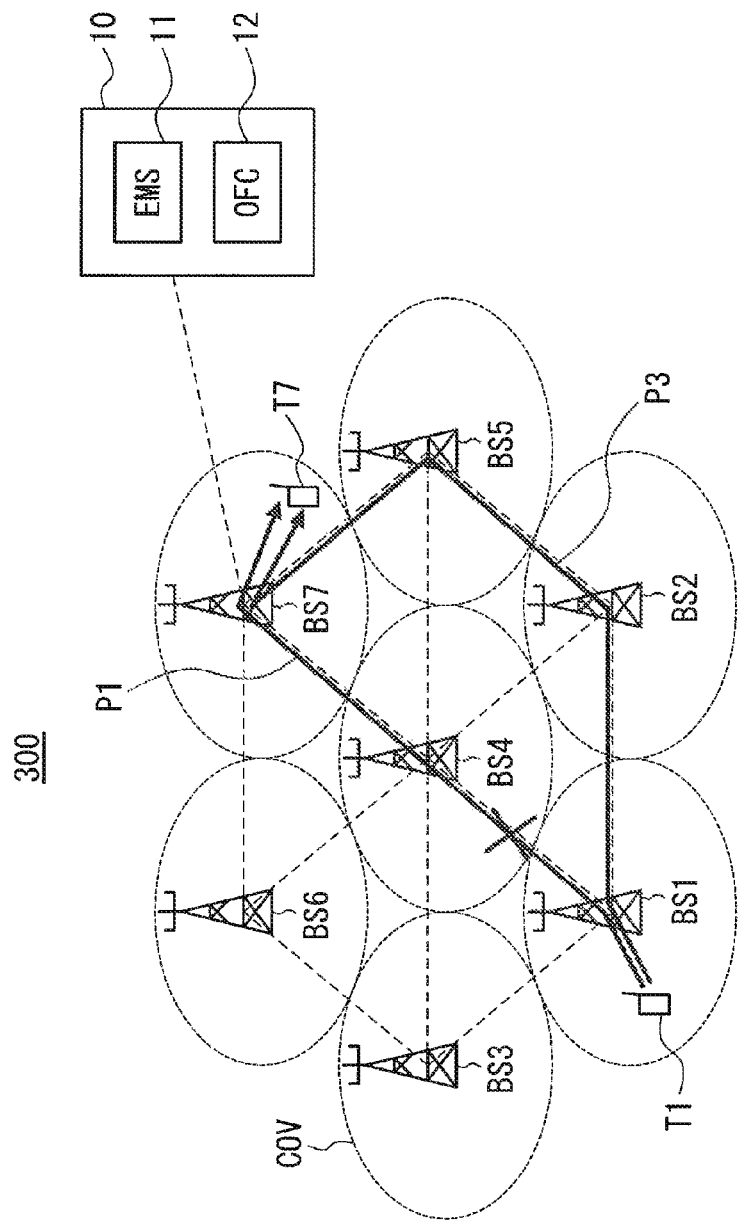
FIG. 9 is a diagram illustrating a switching of communication paths when a failure takes place to a base station BS4 in the communication network 300.

With this configuration, it becomes possible to flexibly set up a communication path in accordance with the condition of the communication network. In other words, when a failure takes place to a portion of the base stations in the communication network 300, for example, the OFC 12 is capable of setting a flow table 7 that includes information on a communication path detouring the failed base station to the OFS 5 of each base station. FIG. 9 is a diagram illustrating a switching of communication paths when a failure takes place to the base station BS4 in the communication network 300.

The OFC 12 receives a failure occurrence notification from the base station BS4. A failure occurrence notification may be transferred to the OFC 12 in the same way as regular data. A base station that is neighboring to the base station BS4 may detect that transmission or reception of data via the base station BS4 is impossible and transmit the failure occurrence notification to the OFC 12.

The OFC 12 recognizes a failure at the base station BS4 through the failure occurrence notification. The OFC 12 then, for example, switches the communication path between the subscriber terminal T1 and the subscriber terminal T7 from a communication path P1 (from T1 to BS1 to BS4 to BS7 to T7) to a communication path P3 (from T1 to BS1 to BS2 to BS5 to BS7 to T7).

As described above, with the configuration according to the third exemplary embodiment, it is possible to provide a communication network through which communication between a communication source and a communication destination is carried out by switching communication paths even when a failure takes place to a base station or a communication path in the communication network.

Fourth Exemplary Embodiment

Figure 10:
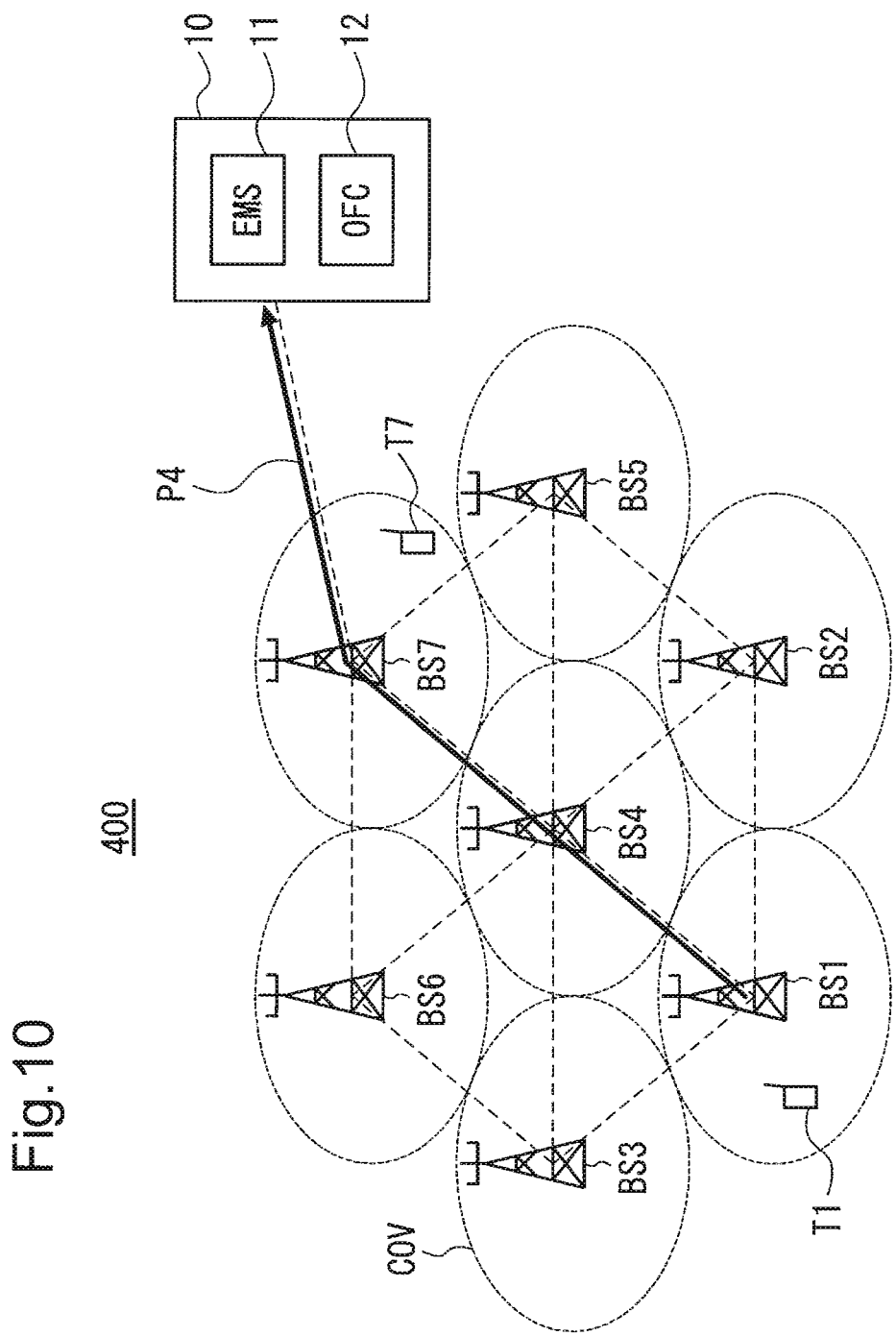
FIG. 10 is a configuration diagram schematically illustrating a configuration of a communication network 400 according to a fourth exemplary embodiment.

Next, a communication network 400 according to a fourth exemplary embodiment will be described. FIG. 10 is a configuration diagram schematically illustrating a configuration of the communication network 400 according to the fourth exemplary embodiment. The communication network 400 is a variation of the communication network 300 according to the third exemplary embodiment. The communication network 400 has a similar configuration to the communication network 100.

In the fourth exemplary embodiment, an OFS 5 of each base station is capable of transmitting a communication history, which records communication handled by the base station, and statistical data based on the communication history to an OFC 12 of a control unit 10 through a communication path P4. For example, the OFS 5 of a base station BS1 transmits a communication history of communication handled by the base station BS1 and statistical data based on the communication history to the OFC 12 of the control unit 10. In the transmission, the communication history of communication handled by the base station BS1 and the statistical data based on the communication history are transferred to the OFC 12 by each base station carrying out the first transfer operation or the second transfer operation. In this case, each of base stations BS1 to BS7 is a communication source. The control unit 10 is a communication destination.

The OFS 5 of each base station may transmit a communication history of communication handled by the base station to the OFC 12, for example, periodically. The OFS 5 of each base station may transmit a communication history of communication handled by the base station to the OFC 12, for example, in response to a request from the OFC 12. In this case, a request from the OFC 12 can be transferred to the OFS 5 of the requested end by each base station carrying out the first transfer operation or the second transfer operation. In this case, the control unit 10 is a communication source. Each of the base stations BS1 to BS7 is a communication destination.

As described above, with the configuration according to the fourth exemplary embodiment, it becomes possible for the OFC 12 to acquire a communication history at each base station and statistical information on communication that each base station has carried out by using a communication function of the communication network.

Fifth Exemplary Embodiment

Figure 11:
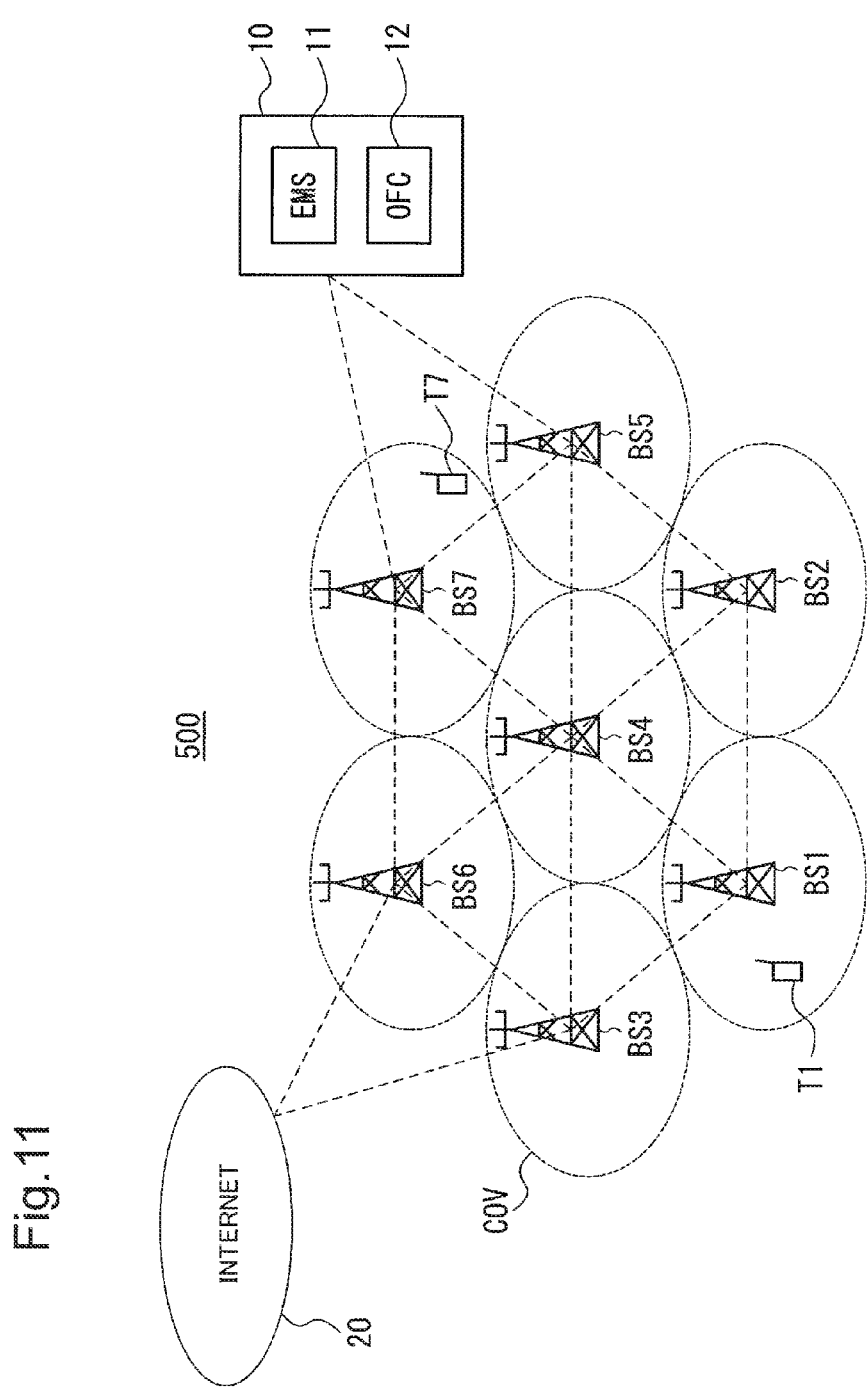
FIG. 11 is a configuration diagram schematically illustrating a configuration of a communication network 500 according to a fifth exemplary embodiment.

Next, a communication network 500 according to a fifth exemplary embodiment will be described. FIG. 11 is a configuration diagram schematically illustrating a configuration of the communication network 500 according to the fifth exemplary embodiment. The communication network 500 has a configuration in which a control unit 10 and the Internet 20 are added to the communication network 100 according to the first exemplary embodiment.

In the communication network 500, base stations BS3 and BS6 are connected to the Internet 20. Base stations BS5 and BS7 are connected to the control unit 10. The other portion of the configuration of the communication network 500 is the same as the configuration of the communication network 100. That is, in the communication network 500, the base stations and the Internet 20, and the base stations and the control unit 10, are redundantly connected to each other, respectively.

In other words, in this configuration, when a failure takes place on a communication path leading to the Internet 20 or the control unit 10, communication with the Internet 20 and the control unit 10 is able to be continued by switching communication paths.

Figure 12:
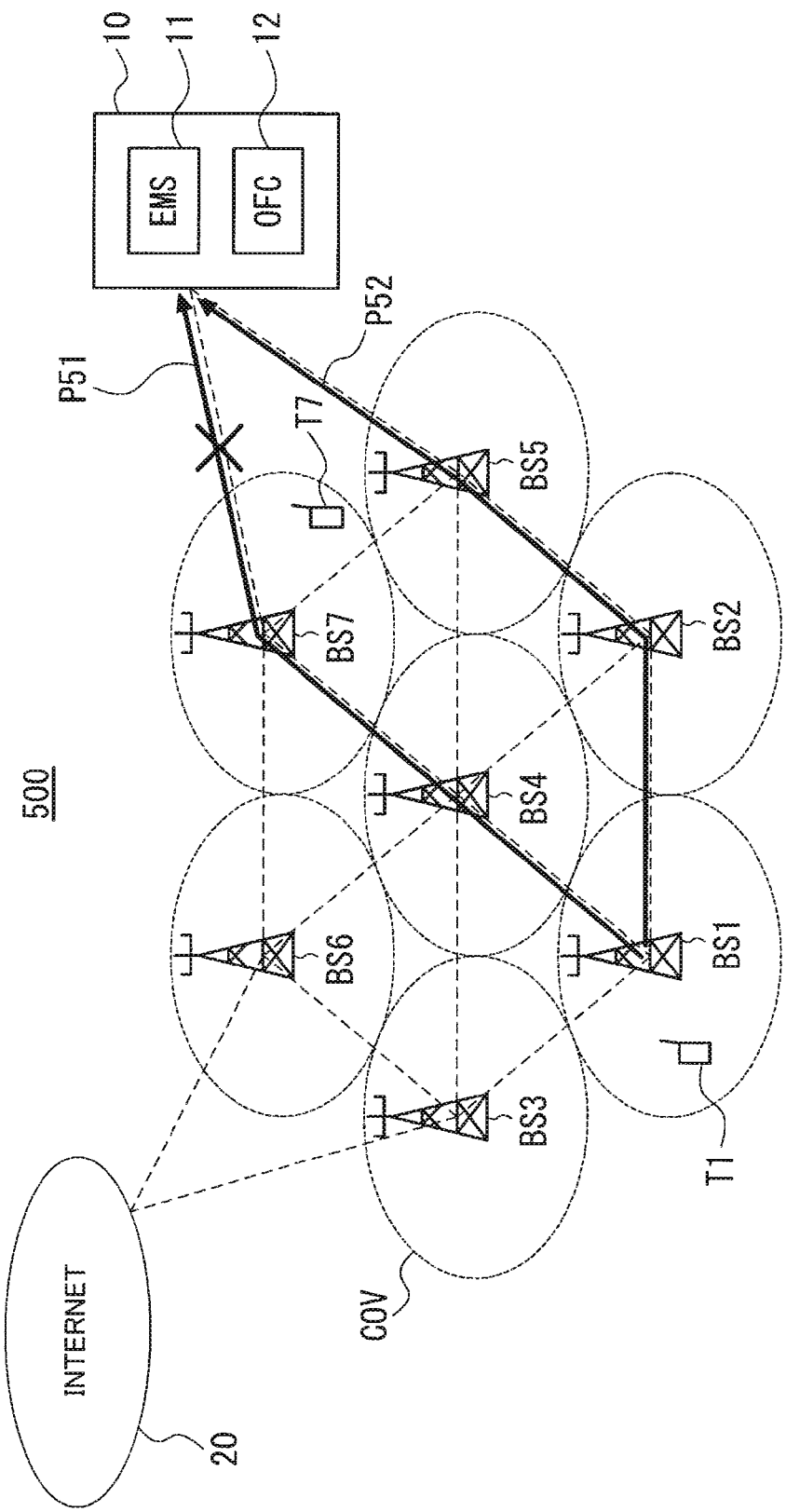
FIG. 12 is a diagram illustrating a switching of communication paths when a failure takes place to communication between a control unit 10 and the base station BS7.

FIG. 12 is a diagram illustrating a switching of communication paths when a failure takes place to communication between the control unit 10 and the base station BS7. In this case, it is possible to continue the communication with the control unit 10 by switching a communication path P51, to which the failure has taken place, between the base station BS7 and the control unit 10 to a normally-working communication path P52 between the base station BS5 and the control unit 10. The switching of communication paths is, as described in the third exemplary embodiment, achieved by the OFC 12 updating a flow table 7 of the OFS 5 in each base station.

Figure 13:
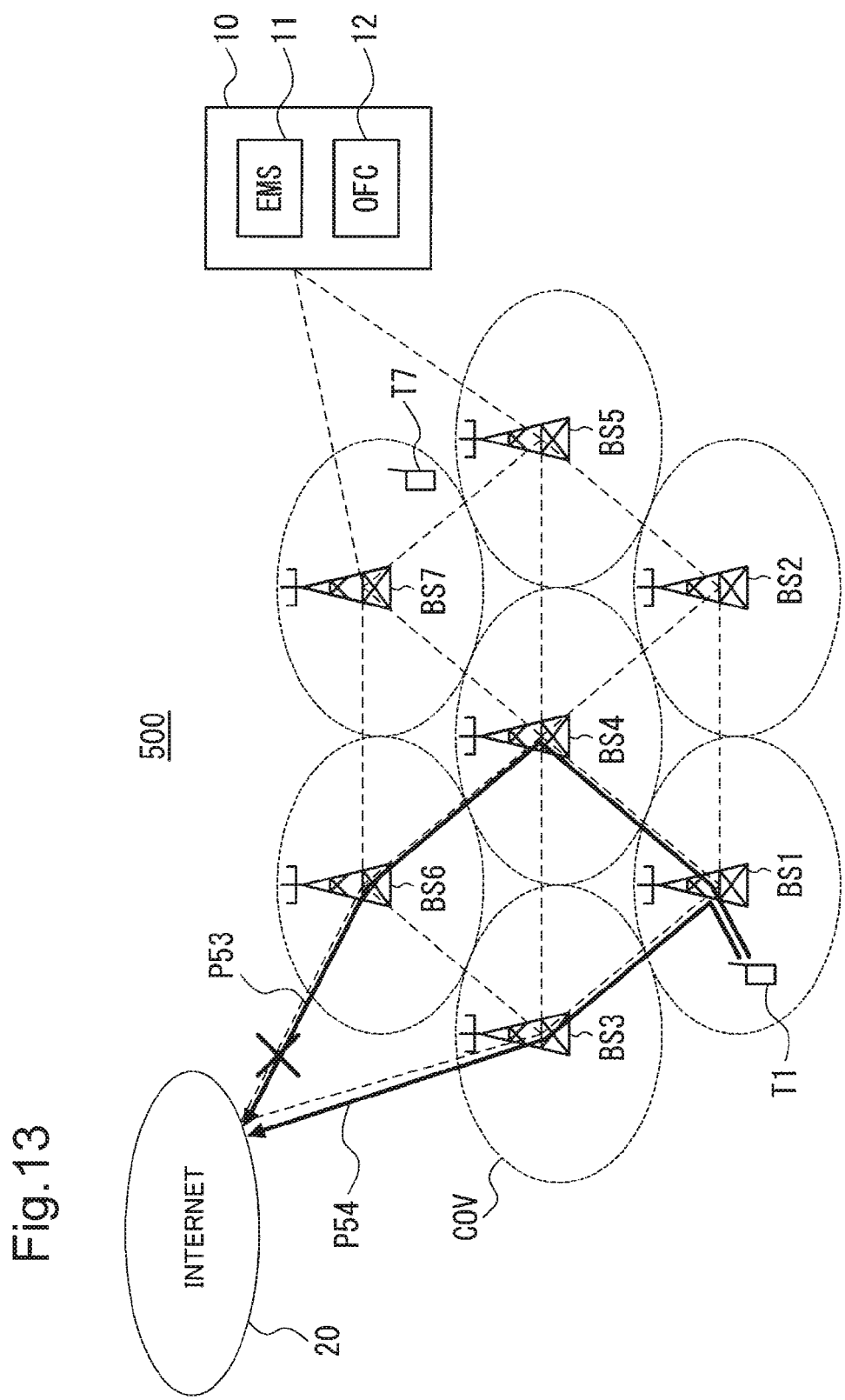
FIG. 13 is a diagram illustrating a switching of communication paths when a failure takes place to communication between the Internet 20 and a base station BS6.

FIG. 13 is a diagram illustrating a switching of communication paths when a failure takes place to communication between the Internet 20 and the base station BS6. In this case, it is possible to continue the communication with the Internet 20 by switching a communication path P53, to which the failure has taken place, between the base station BS6 and the Internet 20 to a normally-working communication path P54 between the base station BS3 and the Internet 20. The switching of communication paths is, as described in the third exemplary embodiment, achieved by the OFC 12 updating the flow table 7 of the OFS 5 in each base station.

As described above, with the configuration according to the fifth exemplary embodiment, by making an external communication network, such as the Internet 20, and the control unit 10 communicable with a plurality of base stations, it is possible to construct a communication network that has more superiority in durability against failures.

The present invention is not limited to the above exemplary embodiments and can be changed appropriately without departing from the spirit and scope of the present invention. For example, a subscriber terminal is not limited to a mobile phone. And other portable or mobile communication devices that are capable of communication, such as an in-vehicle communication system and a GPS (Global Positioning System), can be applied.

Any of the base stations BS1 to BS7 in the above-described communication network 300 is, as with the second exemplary embodiment, able to specify the Internet 20 as a connection destination. In this case, the OFC 12 is also able to acquire the above-described statistical information from the OFSes 5 of the base stations BS1 to BS7 as with the fourth exemplary embodiment.

Any of the base stations BS1 to BS7 in the above-described communication network 400 is, as with the second exemplary embodiment, able to specify the Internet 20 as a connection destination.

In the above-described communication network 500, the OFC 12 is, as with the fourth exemplary embodiment, able to acquire the above-described statistical information from the OFSes 5 of the base stations BS1 to BS7. In the communication network 500, the Internet 20 may be connected to three or more base stations in a communicable manner. The control unit 10 may be connected to three or more base stations in a communicable manner.

In the above-described exemplary embodiments, it is needless to say that each of base stations, subscriber terminals, the Internet 20, and the control unit 10 may be a communication source as well as a communication destination.

All or part of the exemplary embodiments described above may be described as in the following supplementary notes, but the present invention is not limited thereto.

(Supplementary note 1) A communication network, including:
a plurality of base stations that are capable of data transmission and reception with one another,
wherein each of the plurality of base stations includes:
an antenna that receives first uplink data from a subscriber terminal and downlink data transmitted from another base station and transmits downlink data to another base station or a subscriber terminal;
a first data conversion means that converts downlink data received by the antenna to second uplink data;
a communication means that demodulates the first uplink data or the second uplink data, outputs the demodulated first uplink data or the demodulated second uplink data as first data, modulates input second data into downlink data, and transmits the downlink data from the antenna; and
a transfer means that recognizes a communication destination of the first data and, when a transfer of the first data is required, outputs the first data to the communication means as second data.

(Supplementary note 2) The communication network according to Supplementary note 1,
wherein the transfer means includes a decision means that extracts information indicating a communication destination, which is included in the first data, and, when a base station in which the transfer means is incorporated is included in a communication path between a communication source and the communication destination, decides that a transfer of the first data is required.

(Supplementary note 3) The communication network according to Supplementary note 2,
wherein the transfer means, when the base station in which the transfer means is incorporated is not included in the communication path between the communication source and the communication destination, discards the first data.

(Supplementary note 4) The communication network according to Supplementary note 2 or 3,
wherein the decision means includes a table in which information that indicates the communication path between the communication source and the communication destination is registered, and
by comparing the information indicating a communication destination, which is included in the first data, with the table, decides whether or not a transfer of the first data is required.

(Supplementary note 5) The communication network according to Supplementary note 4,
wherein the transfer means further includes a second data conversion means that converts the first data to third data that have a format that makes it possible to extract the information indicating a communication destination, and
the decision means extracts the information indicating a communication destination from the third data.

(Supplementary note 6) The communication network according to Supplementary note 4 or 5, further including:
a control means that controls the plurality of base stations,
wherein the control means includes an information processing means that updates the table of the decision means in each of the plurality of base stations.

(Supplementary note 7) The communication network according to Supplementary note 6,
wherein the information processing means has a function to detect a communication failure on each communication path, which is registered in the table, and
when a communication failure on a first communication path between a communication source and a communication destination, which is registered in the table, is detected, updates the table to replace the first communication path with a second communication path on which communication is possible between the communication source and the communication destination.

(Supplementary note 8) The communication network according to Supplementary note 6 or 7,
wherein the information processing means is connected to one or more base stations with wire communication or wireless communication in a communicable manner.

(Supplementary note 9) The communication network according to Supplementary note 8,
wherein communication sources and communication destinations include the subscriber terminal, the base station, or the control means.

(Supplementary note 10) The communication network according to any one of Supplementary notes 6 to 9,
wherein one or more base stations are connected to another external communication network with wire communication or wireless communication in a communicable manner.

(Supplementary note 11) The communication network according to Supplementary note 10,
wherein communication sources and communication destinations include the other external communication network.

(Supplementary note 12) The communication network according to any one of Supplementary notes 1 to 5,
wherein any one of the plurality of base stations is connected to another external communication network with wire communication or wireless communication in a communicable manner.

(Supplementary note 13) The communication network according to Supplementary note 12,
wherein communication sources and communication destinations include the subscriber terminal, the base station, or the other external communication network.

(Supplementary note 14) A data transmission and reception method of a communication network, the method including the steps of:

receiving first uplink data from a subscriber terminal and downlink data transmitted from another base station by an antenna of each of a plurality of base stations that are capable of reciprocal data transmission and reception;

converting downlink data received by the antenna to second uplink data;

demodulating the first uplink data or the second uplink data and outputting the demodulated first uplink data or second uplink data as first data;

recognizing a communication destination of the first data;

when a transfer of the first data is required, outputting the first data as second data; and modulating the second data into downlink data and transmitting the downlink data.

The present invention was described above through exemplary embodiments thereof, but the present invention is not limited to the above exemplary embodiments, and various modifications that could be understood by a person skilled in the art may be applied to the configurations and details of the present invention within the scope of the present invention.

This application claims priority based on Japanese Patent Application No. 2013-51264, filed on Mar. 14, 2013, the entire disclosure of which is incorporated herein by reference.

REFERENCE SIGNS LIST

1 BS function unit
2 Terminal function unit
3 Transfer unit
4 CN function unit
5 OFS
6 Antenna
7 Flow table
10 Control unit
11 EMS
12 OFC
20 Internet
100, 200, 300, 400, 500 Communication network
BS1 to BS7 Base station
COV Coverage
DAT1, DAT2 Data
DD Downlink data
DU Uplink data
P1 to P4, P51 to P54 Communication path
T1, T7 Subscriber terminal

The invention claimed is:

1. A base station that is capable of data transmission and reception with at least one of a subscriber terminal and another base station among neighboring base stations via wireless communication paths without using core network, the base station comprising:

one or more processors configured to convert downlink data transmitted from another base station to second uplink data which is receivable for demodulation;

a transceiver configured to demodulate first uplink data transmitted from the subscriber terminal in a coverage area of the base station or the second uplink data converted by the one or more processors, output the demodulated first uplink data or the demodulated second uplink data as internal data which is processed in the base station, modulate input internal data which has been processed in the base station into the downlink data to be transmitted to a second base station, wherein the second base station transmits the downlink data to another subscriber terminal served by the second base station;

an internal data converting processor configured to convert the internal data demodulated by the transceiver to predetermined format data for a decision process of the wireless communication path of data transfer, and inversely convert the predetermined format data, on which the decision process has been performed, to the internal data for modulation in the transceiver; and a controller configured to decide whether or not data transfer of the first uplink data received from the subscriber terminal or the downlink data received from the other base station via the wireless communication path is required by recognizing a communication destination included in the predetermined format data, return the predetermined format data to the internal data converter when it is decided that the data transfer is required, and discarding the predetermined format data when it is decided that the data transfer is not required.

2. The base station according to claim 1,
wherein the controller is configured to extract information indicating the communication destination, and to decide that the data transfer of the received first uplink data or the received downlink is required when the base station that is currently deciding whether or not the data transfer is required is included in a predetermined wireless communication path identified by the communication destination, and discard the predetermined format data when the base station which is currently deciding whether or not the data transfer is required is not included in the predetermined wireless communication path identified by the communication destination.

3. The base station according to claim 1,
wherein the controller comprises a table in which information indicating the predetermined wireless communication path identified by the communication destination is registered, and wherein the controller is configured to compare the information indicating the communication destination which is included in the predetermined format data with the table, and decide whether or not the transfer of the first data is required.

4. A data transmission and reception method for a base station that is capable of data transmission and reception with at least one of a subscriber terminal and another base station among neighboring base stations via wireless communication paths without using core network, the method comprising:

receiving first uplink data from the subscriber terminal in a coverage area of the base station or downlink data transmitted from another base station;

converting the downlink data to second uplink data which is receivable for demodulation;

demodulating the first uplink data or the second uplink data and outputting the demodulated first uplink data or the demodulated second uplink data as internal data which is processed in the base station;

converting the internal data to predetermined format data for a decision process of the wireless communication path of data transfer;

deciding whether or not data transfer of the first uplink data received from the subscriber terminal or the downlink data received from the other base station via the the wireless communication path is required by recognizing a communication destination included in the predetermined format data and discarding the predetermined format data when it is decided that the data transfer is not required;
inversely converting the predetermined format data, when it is decided that the data transfer is required, to the internal data for modulation;
modulating the internal data which has been processed in the base station into the downlink data; and
transmitting the downlink data to a second base station, wherein the second base station transmits the downlink data to another subscriber station served by the second base station.

5. The data transmission and reception method according to claim 4, wherein the deciding whether or not the data transfer of the first uplink data received from the subscriber terminal or the downlink data received from the other base station via the wireless communication path is required further comprises:
   extracting information indicating the communication destination included in the predetermined format data,
   deciding that the data transfer of the received first uplink data or the received downlink data is required when the base station which is currently deciding whether or not the data transfer is required is included in a predetermined wireless communication path identified by the communication destination, and
   discarding the predetermined format data when the base station which is currently deciding whether or not the data transfer is required is not included in the predetermined wireless communication path identified by the communication destination.

6. A communication network comprising:
   a plurality of base stations, each base station being capable of data transmission and reception with at least one of a subscriber terminal and another base station among neighboring base stations via wireless communication paths without using core network, each base station including
   one or more processors configured to convert downlink data transmitted from the other base station to second uplink data which is receivable for demodulation,
   a transceiver configured to demodulate first uplink data transmitted from the subscriber terminal in a coverage of the respective base station or the second uplink data converted by the one or more processors and output as internal data which is processed in the respective base station, and configured to modulate the internal data which has been processed in the respective base station into the downlink data to be transmitted outside of the respective base station,
   an internal data converting processor configured to convert the internal data demodulated by the transceiver to predetermined format data for a decision process of the wireless communication path of data transfer, and inversely convert the predetermined format data, on which the decision process has been performed, to the internal data for modulation in the transceiver, and
   a controller configured to decide whether or not data transfer of the first uplink data received from the subscriber terminal or the downlink data received from the other base station via the wireless communication path is required by recognizing a communication destination included in the predetermined format data,
   wherein the plurality of base stations of the communication network comprises:
   a first base station as a communication source which receives the first uplink data from the subscriber terminal in the coverage of the first base station and transmits the downlink data by modulating the internal data which is inversely converted from the predetermined format data by the internal data converting processor when it is decided that the data transfer is required by the controller,
   a plurality of second base stations as neighboring base stations of the first base station, each of the second base stations receives the downlink data transmitted from the first base station or another second base station, transmits the downlink data by modulating the internal data which is inversely converted from the predetermined format data by the internal data converting processor when it is decided that the data transfer is required by the controller and discards the predetermined format data when it is decided that the data transfer is not required by the controller, and
   a third base station as a communication destination which receives the downlink data transmitted from one of the second base stations and transmits the downlink data to the subscriber terminal in the coverage of the third base station by modulating the internal data which is inversely converted from the predetermined format data by the internal data converting processor when it is decided that the data transfer is required by the controller.

7. The communication network according to claim 6, wherein the controller in each of the plurality of base stations is configured to extract information indicating the communication destination, decide that the data transfer of the received first uplink data or the received downlink data is required when the base station which is currently deciding whether or not the data transfer is required is included in a predetermined wireless communication path identified by the communication destination, and discard the predetermined format data when the base station which is currently deciding whether or not the data transfer is required is not included in the predetermined wireless communication path identified by the communication destination.

8. The communication network according to claim 7, wherein the controller comprises a table in which information indicating the predetermined wireless communication path identified by the communication destination is registered, and
   wherein the controller is configured to compare the information indicating the communication destination which is included in the predetermined format data with the table, and to decide whether or not the data transfer of the received first uplink data or the received downlink data is required.

9. The communication network according to claim 8, further comprising:
   a control unit, connected to at least one of the plurality of base stations in the communication network, configured to monitor each base station condition and update the table of the decision unit in each of the plurality of base stations to change the wireless communication path identified by the communication destination.

* * * * *